US010728186B2

(12) United States Patent
Gruschko et al.

(10) Patent No.: US 10,728,186 B2
(45) Date of Patent: Jul. 28, 2020

(54) PREVENTING READER STARVATION DURING ORDER PRESERVING DATA STREAM CONSUMPTION

(71) Applicant: SAP SE, Walldorf (DE)

(72) Inventors: Boris Gruschko, Heidelberg (DE); Christian Mohr, Heidelberg (DE); Martin Strenge, Berlin (DE); Florian Foebel, Buerstadt (DE); Bjoern Friedmann, Rheinmuenster (DE)

(73) Assignee: SAP SE, Walldorf (DE)

(*) Notice: Subject to any disclaimer, the term of this patent is extended or adjusted under 35 U.S.C. 154(b) by 170 days.

(21) Appl. No.: 15/604,019

(22) Filed: May 24, 2017

(65) Prior Publication Data
US 2018/0343213 A1 Nov. 29, 2018

(51) Int. Cl.
G06F 16/27 (2019.01)
G06F 16/901 (2019.01)
H04L 12/58 (2006.01)
G06F 16/2455 (2019.01)
G06F 9/54 (2006.01)
(Continued)

(52) U.S. Cl.
CPC .............. H04L 51/04 (2013.01); G06F 9/546 (2013.01); G06F 16/24568 (2019.01); G06F 16/9024 (2019.01); G06F 16/2228 (2019.01); G06F 16/24554 (2019.01); G06F 16/278 (2019.01); H04L 51/20 (2013.01); H04L 67/1097 (2013.01)

(58) Field of Classification Search
CPC .............. H04L 67/1097; G06F 16/278; G06F 16/2228; G06F 16/24554; G06F 16/24568; G06F 16/9024
See application file for complete search history.

(56) References Cited

U.S. PATENT DOCUMENTS 5,408,663 A    4/1995  Miller
7,873,615 B2   1/2011  Mohr
7,894,602 B2   2/2011  Mueller et al.
(Continued)

OTHER PUBLICATIONS

EPO Communication and European Search Report dated Oct. 25, 2018; for related EP Appln No. 18173566.3-1224; 10 pages.
(Continued)

Primary Examiner — Tom Y Chang
(74) Attorney, Agent, or Firm — Fish & Richardson P.C.

(57) ABSTRACT

The present disclosure involves systems, software, and computer implemented methods for preventing reader starvation in a distributed system. One example method includes receiving, at a node that manages a data stream, a write-intent request from a writer for a first partition, the data stream associated with a graph that includes levels of partitions including a current level; identifying the first partition for the writer; providing partition information for the first partition to enable the writer to write to the first partition; determining that the writer has previously written to a second partition associated with the current level; in response to determining that the writer has previously written to the second partition: creating a new current level; associating the first partition with the new current level; identifying partitions associated with the current level; and providing a close-level instruction to each local node that includes a partition associated with the current level.

20 Claims, 14 Drawing Sheets

(51) Int. Cl.
*H04L 29/08* (2006.01)
*G06F 16/22* (2019.01)

(56) References Cited

U.S. PATENT DOCUMENTS

| | | | |
|---|---|---|---|
| 8,261,295 | B1 | 9/2012 | Risbood |
| 8,352,427 | B2 | 1/2013 | Mohr et al. |
| 8,468,172 | B2 | 6/2013 | Block et al. |
| 8,762,731 | B2 | 6/2014 | Engler et al. |
| 8,984,018 | B2 | 3/2015 | Block et al. |
| 9,002,813 | B2 | 4/2015 | Gruschko et al. |
| 9,043,315 | B2 | 5/2015 | Gruschko et al. |
| 9,065,819 | B1 | 6/2015 | Shanmugam et al. |
| 9,098,549 | B2 | 8/2015 | Gruschko et al. |
| 9,165,000 | B2 | 10/2015 | Block et al. |
| 9,384,249 | B2 | 7/2016 | Block et al. |
| 9,552,387 | B2 | 1/2017 | Foebel et al. |
| 9,794,135 | B2 * | 10/2017 | Theimer .................. H04L 41/24 |
| 2003/0023661 | A1 | 1/2003 | Clohessy |
| 2006/0277280 | A1* | 12/2006 | Craggs ................... H04L 51/26 709/220 |
| 2007/0005887 | A1 | 1/2007 | Larson |
| 2008/0120129 | A1 | 5/2008 | Seubert et al. |
| 2009/0182565 | A1 | 7/2009 | Erickson |
| 2012/0005215 | A1 | 1/2012 | Chow |
| 2012/0144501 | A1 | 6/2012 | Vangpat |
| 2012/0220330 | A1 | 8/2012 | Borden |
| 2013/0074083 | A1 | 3/2013 | Oliver et al. |
| 2013/0152047 | A1 | 6/2013 | Moorthi |
| 2013/0332424 | A1 | 12/2013 | Nos et al. |
| 2013/0339079 | A1 | 12/2013 | Benayon |
| 2014/0007051 | A1 | 1/2014 | Ritter et al. |
| 2014/0026131 | A1 | 1/2014 | Ravi |
| 2014/0040993 | A1 | 2/2014 | Lorenzo |
| 2014/0108440 | A1 | 4/2014 | Nos |
| 2014/0280946 | A1 | 9/2014 | Mukherjee |
| 2014/0282919 | A1 | 9/2014 | Mason |
| 2014/0373011 | A1 | 12/2014 | Anderson et al. |
| 2015/0089597 | A1 | 3/2015 | Srinivasan et al. |
| 2015/0089623 | A1 | 3/2015 | Sondhi |
| 2015/0220325 | A1 | 8/2015 | Poon |
| 2015/0237049 | A1 | 8/2015 | Grajek et al. |
| 2015/0365275 | A1 | 12/2015 | Iliev |
| 2016/0077818 | A1 | 3/2016 | Nos et al. |
| 2017/0083579 | A1* | 3/2017 | Du .................... G06F 17/30194 |
| 2017/0235645 | A1* | 8/2017 | Theimer ............. G06F 11/1461 707/634 |

OTHER PUBLICATIONS

Anonymous: "Apache Kafka", Sep. 27, 2015, pp. 1-33, XP055349143, URL: http://web.archive.org/web/20150927133454/http://kafka.apache.org/documentation.html#introduction [retrieved on Feb. 23, 2017].

Jay Kreps et al.: Kafka: a Distributed Messaging System for Log Processing, NetDB 2011, Athens, Greece, Jun. 12, 2011, XP055186290, ACM, http://research.Icrosoft.com/en-us/um/people/srikanth/netdb11/netdb11papers/netdb11-final12.pdf [retrieved on Apr. 28, 2015].

U.S. Appl. No. 15/203,410, filed Jul. 6, 2016, Gruschko, Boris.

* cited by examiner

PREVENTING READER STARVATION DURING ORDER PRESERVING DATA STREAM CONSUMPTION

TECHNICAL FIELD

The present disclosure relates to computer-implemented methods, software, and systems for preventing reader starvation in a distributed messaging system.

BACKGROUND

Modern computing systems are typically tasked with solving large computational problems, such as effectively processing large amounts of data. To do so, such systems can operate in a distributed system environment. A distributed computing environment can include components or nodes that may be located on networked computers, which can communicate and/or coordinate with one another by exchanging messages in order to achieve a common goal. Distributed computing systems are typically characterized by concurrency of components, lack of a global clock, and independent failure of components. In distributed systems, data can be written to and read from data streams representing an ordered sequence of messages, where data can be distributed among many different computing locations.

SUMMARY

The present disclosure involves systems, software, and computer implemented methods for preventing reader starvation in a distributed messaging system. One example method includes receiving, at a node that manages a data stream, a write-intent request from a writer for a first partition, the data stream associated with a graph that includes levels of partitions including a current level; identifying the first partition for the writer; providing partition information for the first partition to enable the writer to write to the first partition; determining that the writer has previously written to a second partition associated with the current level; in response to determining that the writer has previously written to the second partition: creating a new current level; associating the first partition with the new current level; identifying partitions associated with the current level; and providing a close-level instruction to each local node that includes a partition associated with the current level.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

A distributed system can be used to spread out data storage and processing responsibilities to a set of multiple nodes. Distributed systems can be used for storage and management of data streams, for example. A data stream can be any type of data, such as sensor data from an TOT (Internet of Things) network, database data, transactional data, topic data, feed data, etc. Data for the data stream can be stored in partitions, which can reside on various nodes. Writer and reader processes can write to and read from partitions, respectively. A managing broker for a data stream can manage partitions that are part of the data stream. Partitions can be created dynamically, such as in response to the filling of currently used partitions. For some data streams, a slow writer may cause a delay for some readers, such as when a particular reader is waiting to read a particular slowly-filling partition before reading other partitions. A reader being delayed by a slow writer can be referred to as reader starvation. As described in more detail below, the managing of partitions into levels and the triggering of level closing can solve the issue of reader starvation and remove or lessen the delay of a reader waiting for a slow writer. A level is a grouping of partitions so that at most one partition for a writer is at a same level.

Level management and closing can be implemented without requiring or adding significant overhead or complexity for distributed system components. Level closing can include flexible features which enable a local broker on a given node to determine, using local information, exactly when a given partition is closed. Such flexibility can avoid disturbing operations when there are no slow writers leading to reader starvation. Level management can be implemented by distributing responsibility across nodes in a decentralized design, including assigning specific tasks and responsibilities to a managing broker, local brokers, and reader and writer processes. Closing of levels can be done at a well-defined point in time, such as when a new level is created, which can be more efficient than periodic analysis of partitions to determine which partitions to close.

Figure 1:
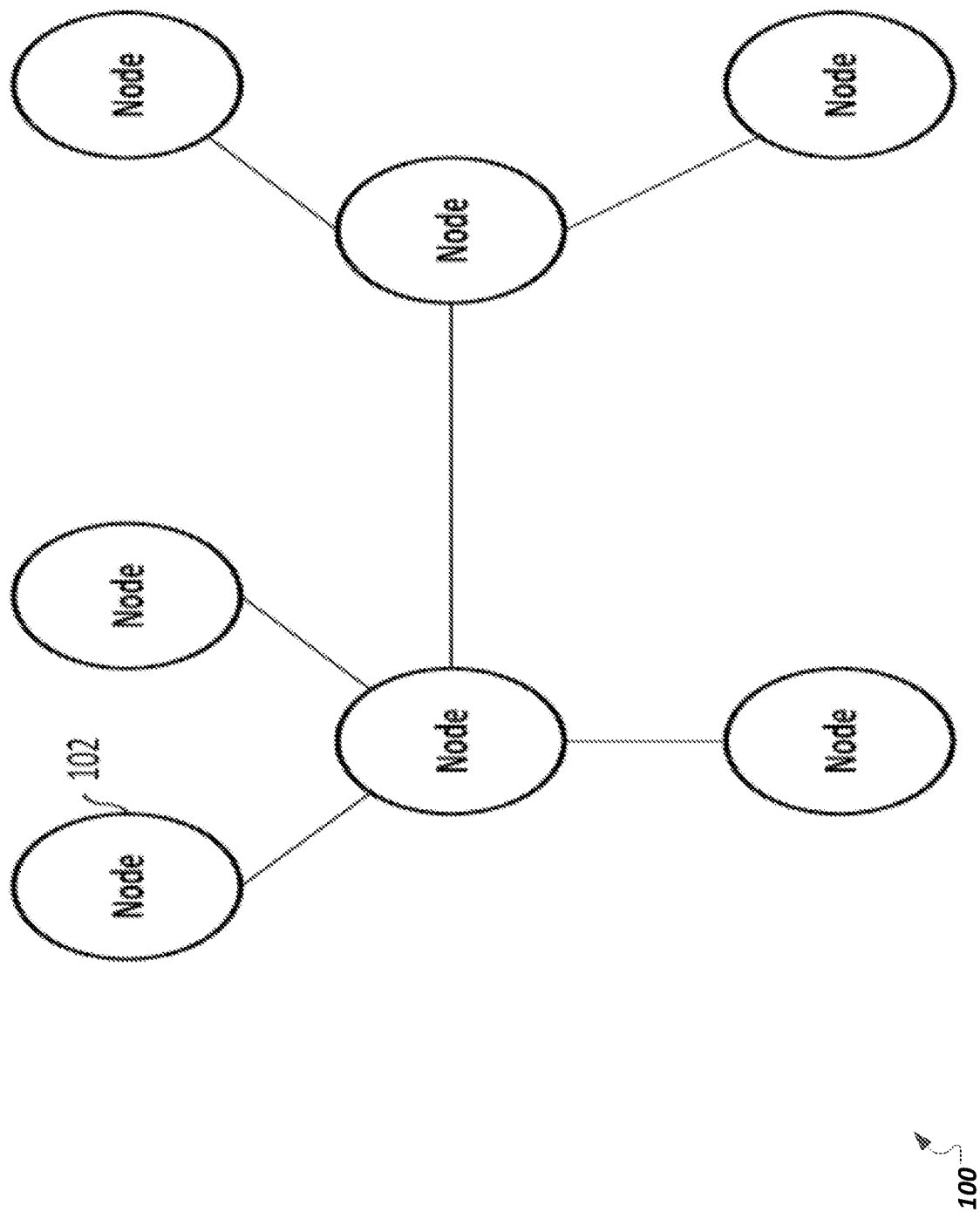
FIG. 1 illustrates an exemplary distributed messaging system.

FIG. 1 illustrates an exemplary distributed messaging system 100. The system 100 can include a plurality of computing nodes that can be communicatively coupled with one another and process data streams. In the distributed messaging system 100, data can be written to and/or read from data streams, which can represent an ordered sequence of messages. Such data streams can be also referred to as feeds, topics and/or transactions. The data can be distributed across physical locations, e.g., on different computing terminals, servers, databases, etc. in a network, and/or managed by separate processes. A physical and/or logical unit that can have a specific role in the distributed messaging system 100 can be referred to as a node of the distributed messaging system. As shown in FIG. 1, the distributed messaging system 100 can include a plurality of nodes including a node 102. Nodes belonging to an instance of the distributed messaging system 100 can be referred to as a cluster.

In the distributed messaging system 100, one or more processes, referred to as writers or producers, can write or publish data to a data stream. One or more processes, referred to as readers or consumers, can read data from a data stream (e.g., a reader can be subscribed to and process the feed of published messages). Readers and writers can be both referred to as clients. In order to perform read and/or write operations, clients can exchange messages with the distributed messaging system 100.

Figure 2:
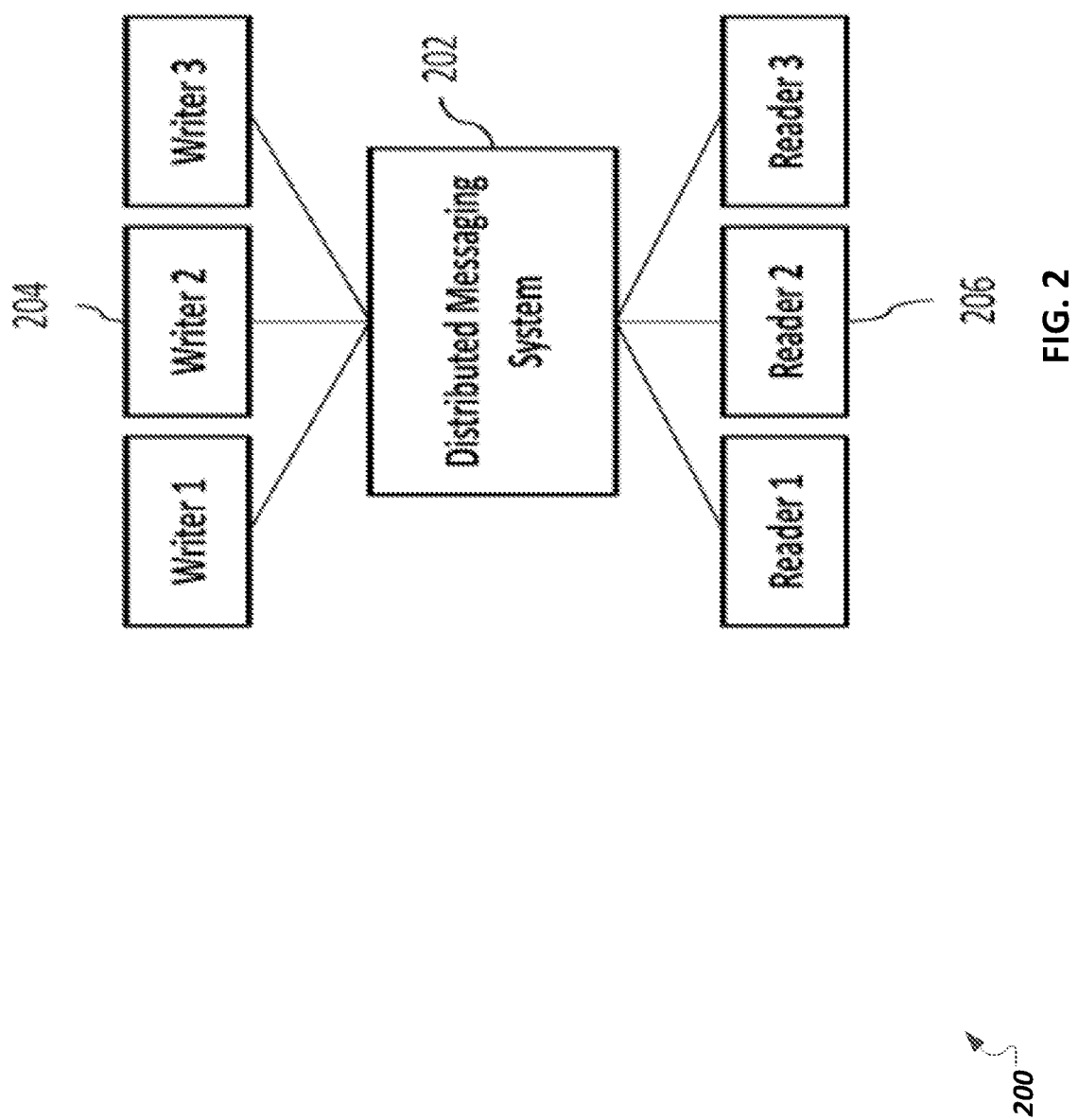
FIG. 2 illustrates an exemplary system having a plurality of writers and a plurality of readers.

FIG. 2 illustrates an exemplary system 200. The system 200 can include a plurality of writers (e.g., writers 1-3) 204 and a plurality of readers (e.g., readers 1-3) 206. The writers 204 and the readers 206 can be communicatively coupled to a distributed messaging system 202. The distributed messaging system 202 can guarantee to preserve an order in which data is written to a data stream, which means that readers can receive messages in a data stream in the same order as were written to the stream by a writer.

Figure 3:
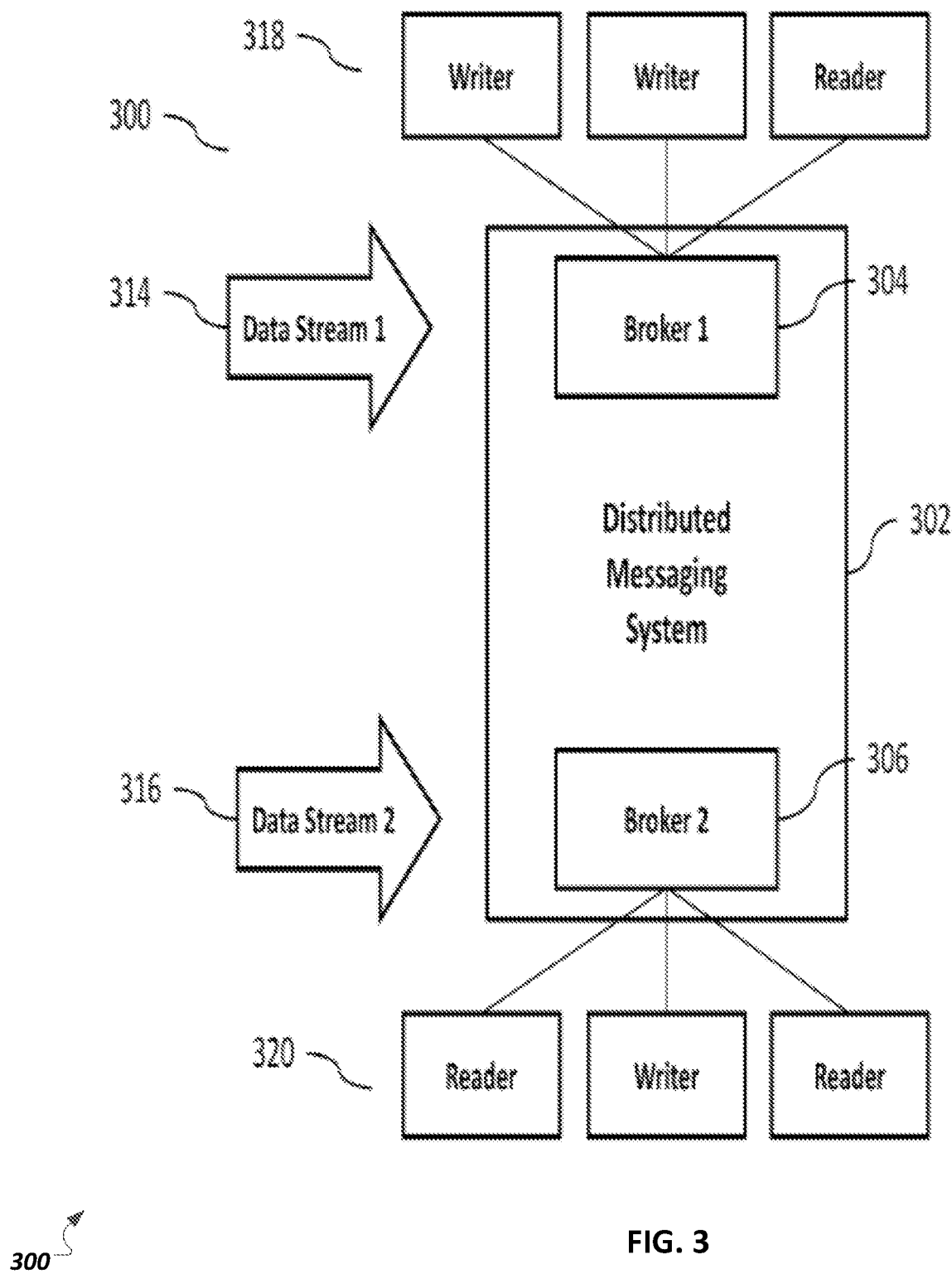
FIG. 3 illustrates an exemplary computing system.

FIG. 3 illustrates an exemplary computing system 300. The system 300 can include a distributed messaging system 302, a plurality of clients 318 and 320 (e.g., readers, writers), and brokers 304 and 306. The brokers 304 and 306 can be represented as multiple processes. Each broker 304 or 306 can communicate with the clients 318 or 320 and can be responsible for managing a particular data stream and/or hosting one or more partitions of a particular data stream. For example, as shown in FIG. 3, the broker 304 can be assigned to manage a data stream 314 and can communicate with the clients 318 (e.g., two writers and one reader). The broker 306 can be assigned to manage a data stream 316 and can communicate with the clients 320 (e.g., two readers and one writer). The data streams 314 and 316 can be assigned to a managing broker using a variety of approaches, utilizing different strategies, etc. If an assigned managing broker is defective and/or becomes defective at system runtime, the assignment of data streams to managing brokers can be altered. As described below, a data stream can be subdivided into a rooted acyclic directed graph of partitions.

In general, clients (readers or writers) can send read/write-intent requests to any broker. If the receiving broker is not managing the data stream referenced in the request, the broker can respond with a message redirecting the client to the managing broker of the data stream. After receiving a redirect response, clients can contact the managing broker with the original read/write-intent request. The managing broker can respond with information about a partition to read from/write to. The information can include location information about the broker hosting the partition. Clients can send read/write-partition requests to the broker hosting the partition (e.g., facilitating the actual data exchange). Multiple messages can be exchanged between clients and brokers in order to implement read/write-intent requests and read/write-partition requests.

Figure 4:
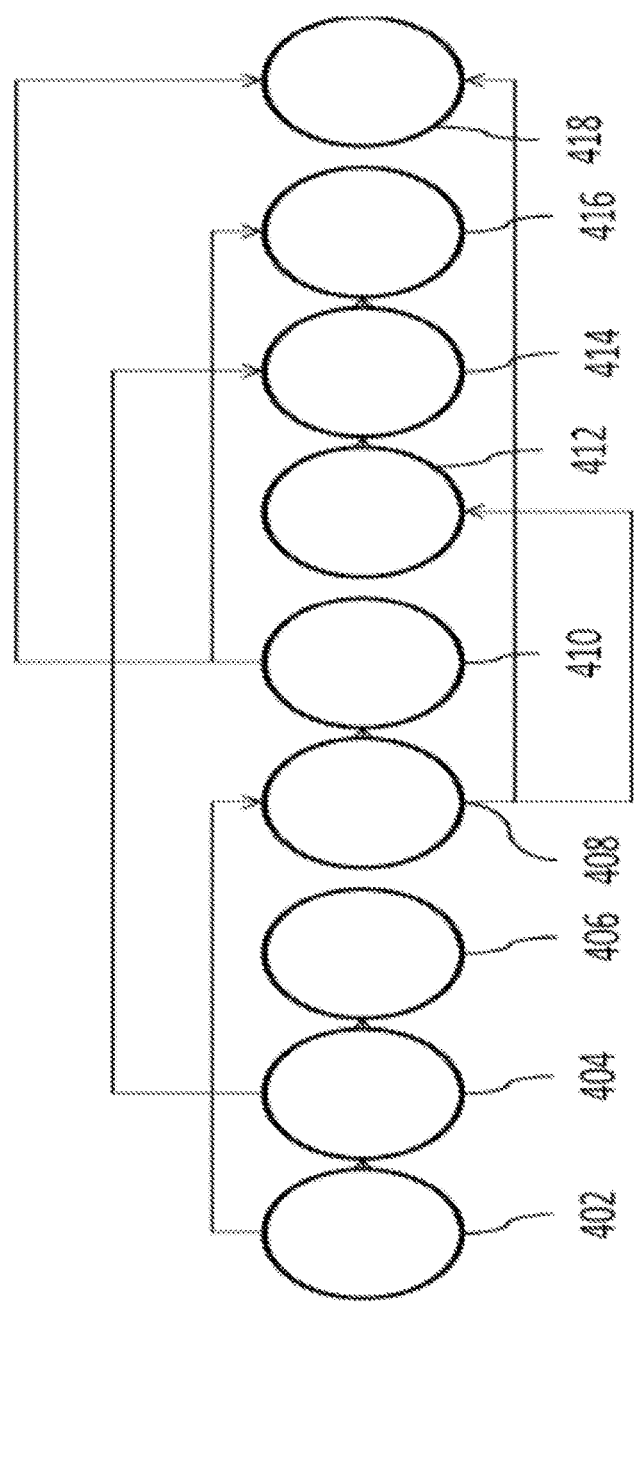
FIG. 4 illustrates an exemplary acyclic directed graph.

FIG. 4 illustrates an exemplary acyclic directed graph 400. An acyclic directed graph can be a finite directed graph without directed cycles. The graph 400 can include finitely many vertices and edges. Each edge can be directed from one vertex to another, such that there is no way to start at a vertex and follow a consistently-directed sequence of edges that eventually loops back to the same vertex again. The graph 400 can include a plurality of vertices 402-418 connected by edges (shown as arrows). For example, the vertex 402 can be connected to the vertex 404 and the vertex 408; the vertex 404 can be connected to the vertex 406 and the vertex 414; and so on. As described in more detail below, a vertex and/or collection of vertices can represent a partition of data. Each partition can represent an ordered sequence of messages in a data stream.

Figure 5:
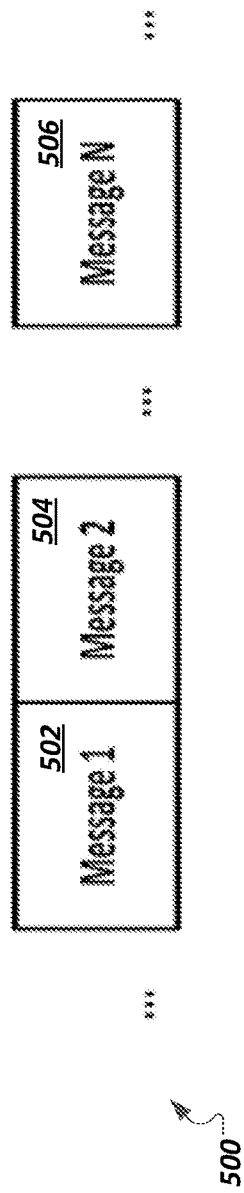
FIG. 5 illustrates an exemplary partition including an ordered sequence of messages.

FIG. 5 illustrates an exemplary partition 500 including an ordered sequence of messages including messages 502, 504, 506, and possibly other messages. The partitions of a data stream can be distributed across brokers in a distributed messaging system. Information about existing data streams and the structure of their partition graphs can be maintained by managing brokers and stored persistently to allow other brokers to take over management if necessary (e.g., in the event of a failover).

Figure 6:
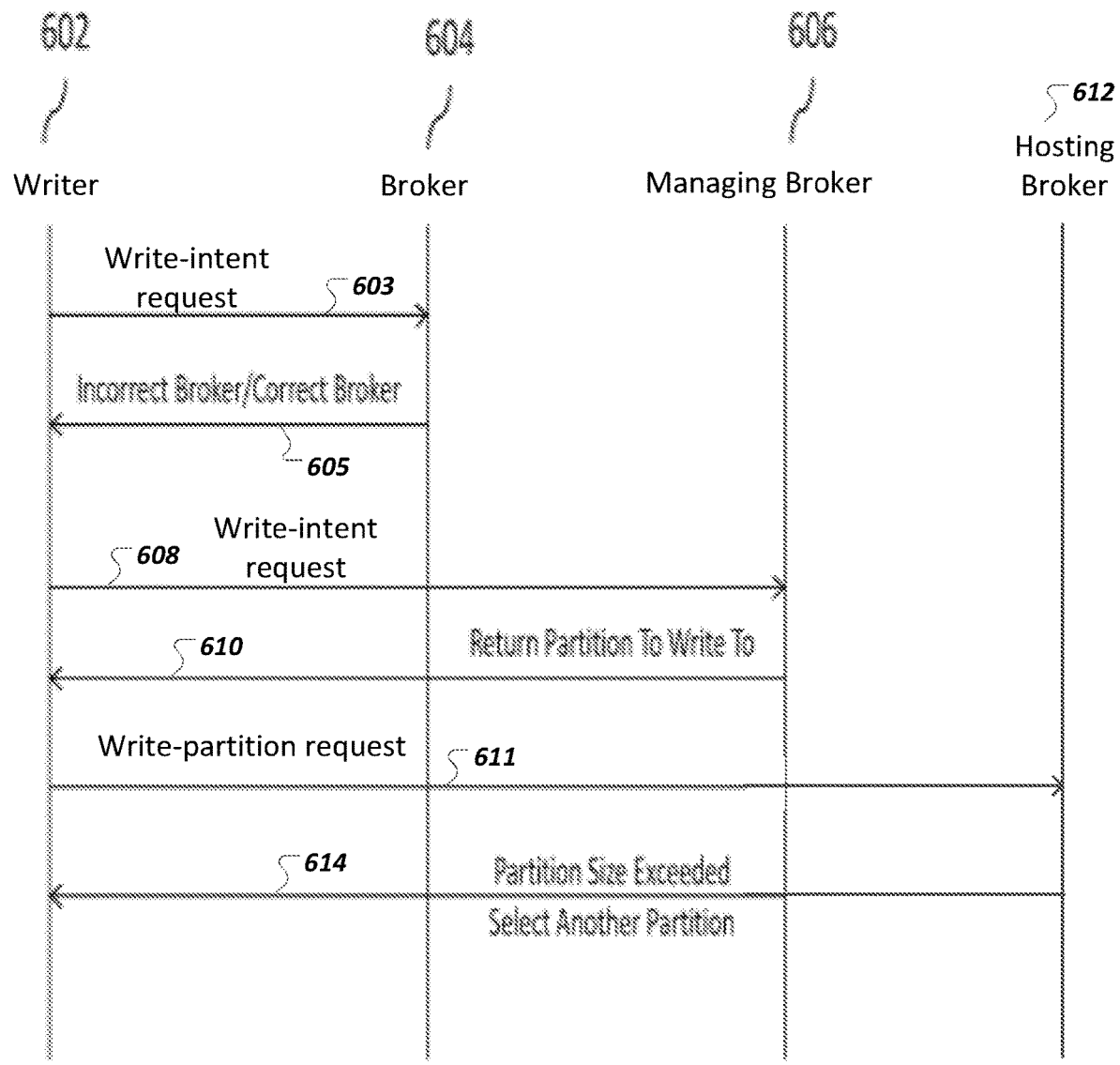
FIG. 6 illustrates an exemplary process for writing data to a data stream.

FIG. 6 illustrates an exemplary process 600 for writing data to a data stream. A writer 602 can generate and transmit a write-intent request 603 to a particular broker 604 in a distributed messaging system. The write-intent request 603 can indicate an intent of the writer 602 to write to a particular data stream. A determination can be made as to whether the broker 604 is a managing broker for the particular data stream. In the event that the broker 604 is not the managing broker for the data stream, the writer 602 can receive a response message 605 from the broker 604 advising the writer 602 to contact a managing broker 606 with the write-intent request. The writer 602 can send a write-intent request 608 to the managing broker 606. The managing broker 606 returns partition information 610 (e.g., location information) for a partition that the writer 602 can write to.

The writer 602 can write to the partition referenced by the partition information 610 by sending one or more messages (e.g., a write-partition request 611) to a hosting broker 612 that hosts the partition corresponding to the partition information 610. In some implementations, the partition referenced by the partition information 610 has a predetermined size limit, which can prevent the writing of further messages once the size limit has been exceeded. If the size of the partition is exceeded, the hosting broker 612 can transmit a partition full message 614 to the writer 602 indicating that writing to the partition may not be possible and that future messages should be written to another partition. The writer 602 can contact the managing broker 606 to find out which partition the writer 602 should write to next.

Figure 7:
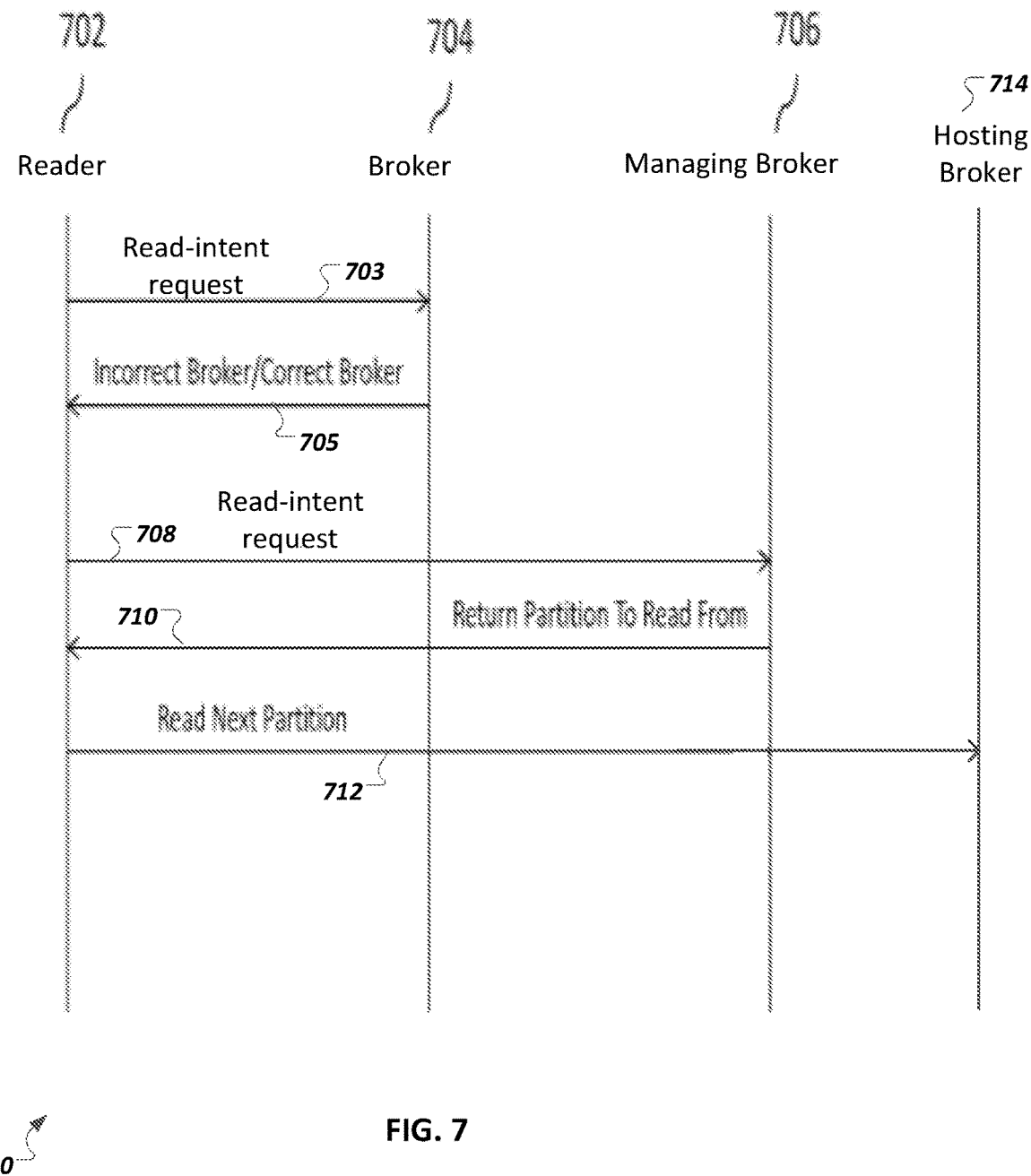
FIG. 7 illustrates an exemplary process for reading data from a data stream.

FIG. 7 illustrates an exemplary process 700 for reading data from a data stream. A reader 702 can generate and transmit a read-intent request 703 to a broker 704 in a distributed messaging system. The read-intent request 703 can indicate an intent of the reader 702 to read from a particular data stream. In the event the broker 704 is not a managing broker for the data stream, the reader 702 can receive a response message 705 from the broker 704 indicating that the broker 704 is not the managing broker and advising the writer 702 to contact a managing broker 706 (e.g., a read-intent request 708). The managing broker 706 can return partition information 710 for a partition corresponding to the requested data stream. The reader 702 can send a read-partition request 712 to a hosting broker 714 to read data from the partition referenced by the partition information 710. After the complete partition has been read, the reader 702 can send a message to the managing broker 706 to obtain the next partition to read from.

Figure 8:
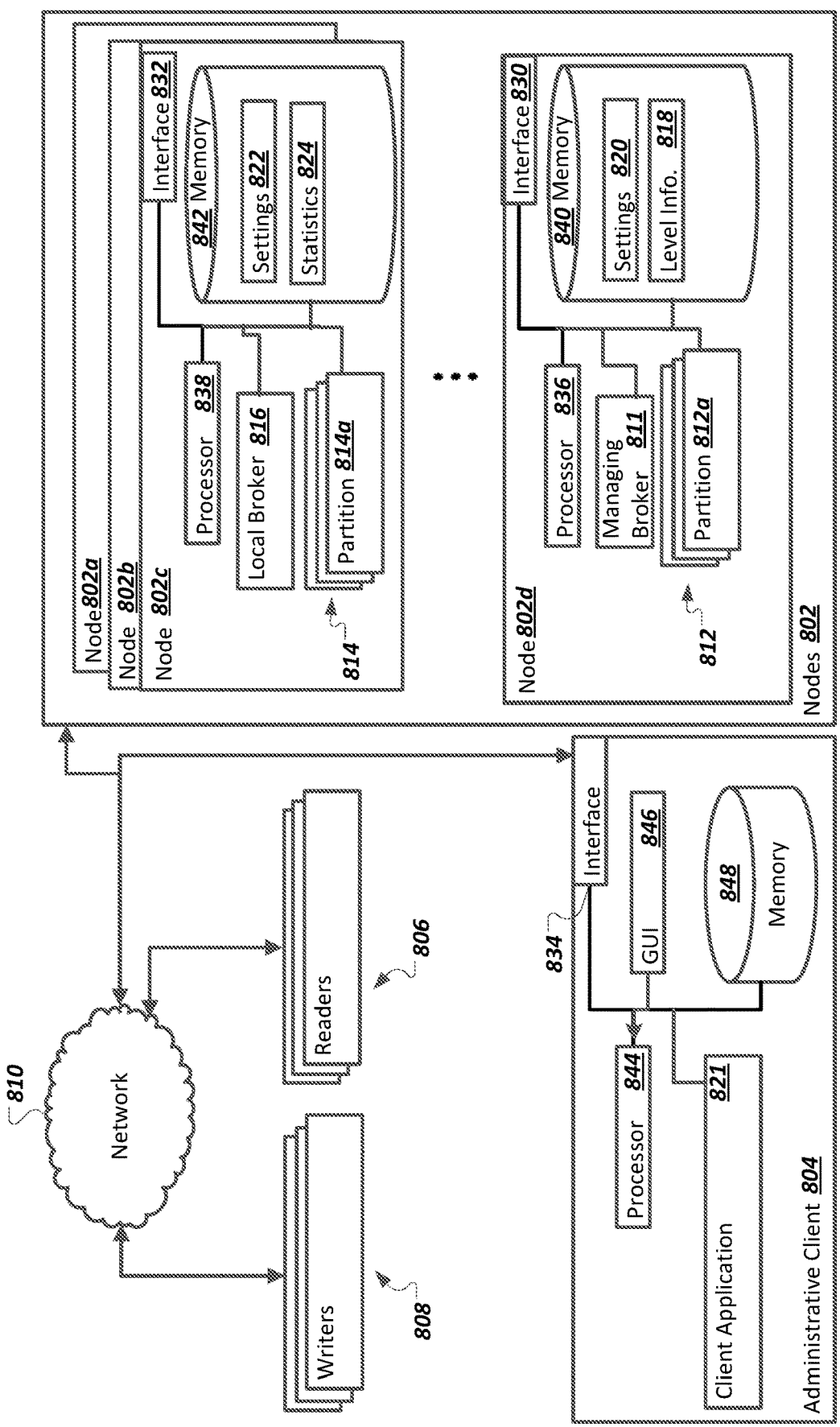
FIG. 8 is a block diagram illustrating an example environment for preventing reader starvation in a distributed system.

FIG. 8 is a block diagram illustrating an example environment for preventing reader starvation in a distributed system 800. Specifically, the illustrated system 800 includes or is communicably coupled with a set of nodes 802, an administrative client device 804, a set of readers 806, a set of writers 808, and a network 810. Although shown separately, in some implementations, functionality of two or more systems or servers may be provided by a single system or server. In some implementations, the functionality of one illustrated system or server may be provided by multiple systems or servers.

The set of nodes 802 includes a managing node 802d that includes a managing broker 811 that manages a particular data stream provided by the distributed system 800. The readers 806 can read from the data stream and the writers 808 can write to the data stream. The data stream can be stored in partition(s) included in nodes 802 of the distributed system 100. For example, the managing node 802d includes partitions 812 including a partition 812a. Each partition 812 can include a sequence of messages. Some, none, or all of the partitions 812 may be associated with the particular data stream (and some, none, or all of the partitions 812 may be associated with one or more other data streams). The managing node 802d may or may not include host partition(s) for the data stream it manages. Some or all partitions for the data stream may be included in local nodes that are distinct from the managing node 802d.

For example, a local node 802c includes partitions 814 including a partition 814a. Some or all of the partitions 814 can be associated with the data stream and some of the partitions 814 can be associated with one or more other data streams. The local node 802c can include a local broker 816 that manages the partitions 814 included in the local node 802c.

The readers 806 and the writers 808 can each be processes that can run on one or more of the nodes 802 and/or on another node or system. As described in more detail below, a reader 806 can be blocked from other work while attempting to read data from the data stream that is provided by a slow writer 808 in a situation that can be referred to as reader starvation. To avoid and/or manage reader starvation, managing nodes such as the node 802c can manage levels of partitions using level information 818.

The level information 818 can include a data stream graph for the data stream that is managed by the managing broker 811. The managing broker 811 can manage levels in the data stream graph such that each level includes at most one partition for a given writer 808. If a particular partition associated with a current level is to be closed (e.g., because the particular partition is full or some other determination has been made to close the partition), the current level can be closed. A close level instruction can be sent to all local nodes that include a partition associated with the current level. For example, the managing broker 811 can send a close-level instruction to the local broker 816 for the closing of the partition 814a.

The close-level instruction can be associated with a closing deadline. For example, the close-level instruction can include a particular closing deadline (e.g., "close within one minute"). The managing broker 811 can determine and include the closing deadline in the close-level instruction, for example. The closing deadline may be a data stream level setting retrieved from a settings area 820. As another example, the closing deadline may be a system level setting that is retrieved from the settings area 820 or from another node (e.g., a central node (not shown) associated with multiple data streams). A data stream level setting and/or a system level setting may have been received from a client application 821 running on the administrative client device 804, for example.

As another example, the closing deadline can be determined by each local node. For example, the local broker 816 can determine the closing deadline from a settings area 822. The closing deadline can be a per-partition or per-local-node setting, for example. As yet another example, the local broker 816 can dynamically determine the closing deadline, such as from statistics 824. The statistics 824 can include information about a recent write rate, a recent read rate, a number of recent readers or writers, or other information about the use of the partition 814a.

Once the partition 814a is closed, the local broker 816 can reject write-partition requests from writers 808 who request to write to the partition 814a. A writer 808 that receives a rejection can request a new partition from the managing broker 811. The managing broker 811 can identify a new partition for the writer 808, associate the new partition with a new level, and update the level information 818. The use of levels is described in more detail below.

Each of the nodes 802, the readers, and the administrative client device 804 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the nodes 802 and the administrative client device 804 may be adapted to execute any operating system, including Linux, UNIX, Windows, Mac OS®, Java™, Android™, iOS or any other suitable operating system. According to one implementation, one or more of the nodes 802 may also include or be communicably coupled with an e-mail server, a Web server, a caching server, a streaming data server, and/or other suitable server.

Interfaces 830, 832, and 834 are used by the managing node 802d, the local node 802c, and the administrative client device 804, respectively, for communicating with other systems in a distributed environment—including within the system 800—connected to the network 810. Generally, the interfaces 830, 832, and 834 each comprise logic encoded in software and/or hardware in a suitable combination and operable to communicate with the network 810. More specifically, the interfaces 830, 832, and 834 may each comprise software supporting one or more communication protocols associated with communications such that the network 810 or interface's hardware is operable to communicate physical signals within and outside of the illustrated system 800.

The managing node 802d and the local node 802s each respectively include one or more processors 836 or 838. Each of the processors 836 and 838 may be a central processing unit (CPU), a blade, an application specific integrated circuit (ASIC), a field-programmable gate array (FPGA), or another suitable component. Generally, each of the processors 836 and 838 executes instructions and manipulates data to perform the operations of the database system 802.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 8 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The managing node 802d and the local node 802c respectively include the memory 840 or 842. In some implementations, the database system 802 includes multiple memories. The memories 840 and 842 may each include any type of memory or database module and may take the form of volatile and/or non-volatile memory including, without limitation, magnetic media, optical media, random access memory (RAM), read-only memory (ROM), removable media, or any other suitable local or remote memory component. The memories 840 and 842 may each store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the distributed system 800.

The administrative client device 804 may generally be any computing device operable to connect to or communicate within the distributed system 800 via the network 810 using a wireline or wireless connection. In general, the administrative client device 804 comprises an electronic computer device operable to receive, transmit, process, and store any appropriate data associated with the system 800 of FIG. 8. The administrative client device 804 can include one or more client applications, including the client application 821. A client application is any type of application that allows the administrative client device 804 to request and view content on the administrative client device 804. In some implementations, a client application can use parameters, metadata, and other information received at launch to access a particular set of data from the distributed system 800. In some instances, a client application may be an agent or client-side version of the one or more enterprise applications running on an enterprise server (not shown).

The client device 804 further includes one or more processors 844. Each processor 844 included in the administrative client device 804 may be a central processing unit (CPU), an application specific integrated circuit (ASIC), a field-programmable gate array (FPGA), or another suitable component. Generally, each processor 844 included in the administrative client device 804 executes instructions and manipulates data to perform the operations of the administrative client device 804.

The administrative client device 804 is generally intended to encompass any client computing device such as a laptop/notebook computer, wireless data port, smart phone, personal data assistant (PDA), tablet computing device, one or more processors within these devices, or any other suitable processing device. For example, the client device 804 may comprise a computer that includes an input device, such as a keypad, touch screen, or other device that can accept user information, and an output device that conveys information associated with the operation of the distributed system 800, or the administrative client device 804 itself, including digital data, visual information, or a graphical user interface (GUI) 846.

The GUI 846 of the administrative client device 804 interfaces with at least a portion of the system 800 for any suitable purpose, including generating a visual representation of the client application 821. In particular, the GUI 846 may be used to view and navigate various Web pages. Generally, the GUI 846 provides the user with an efficient and user-friendly presentation of business data provided by or communicated within the system. The GUI 846 may comprise a plurality of customizable frames or views having interactive fields, pull-down lists, and buttons operated by the user. The GUI 846 contemplates any suitable graphical user interface, such as a combination of a generic web browser, intelligent engine, and command line interface (CLI) that processes information and efficiently presents the results to the user visually.

Memory 848 included in the administrative client device 804 may include any memory or database module and may take the form of volatile or non-volatile memory including, without limitation, magnetic media, optical media, random access memory (RAM), read-only memory (ROM), removable media, or any other suitable local or remote memory component. The memory 846 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the administrative client device 804.

There may be any number of administrative client devices 804 associated with, or external to, the system 800. For example, while the illustrated system 800 includes one administrative client device 804, alternative implementations of the system 800 may include multiple administrative client devices 804 communicably coupled to the network 810, or any other number suitable to the purposes of the system 800. Additionally, there may also be one or more additional administrative client devices 804 external to the illustrated portion of system 800 that are capable of interacting with the system 800 via the network 810. Further, the term "client", "client device" and "user" may be used interchangeably as appropriate without departing from the scope of this disclosure. Moreover, while the administrative client device 804 is described in terms of being used by a single user, this disclosure contemplates that many users may use one computer, or that one user may use multiple computers.

Figure 9:
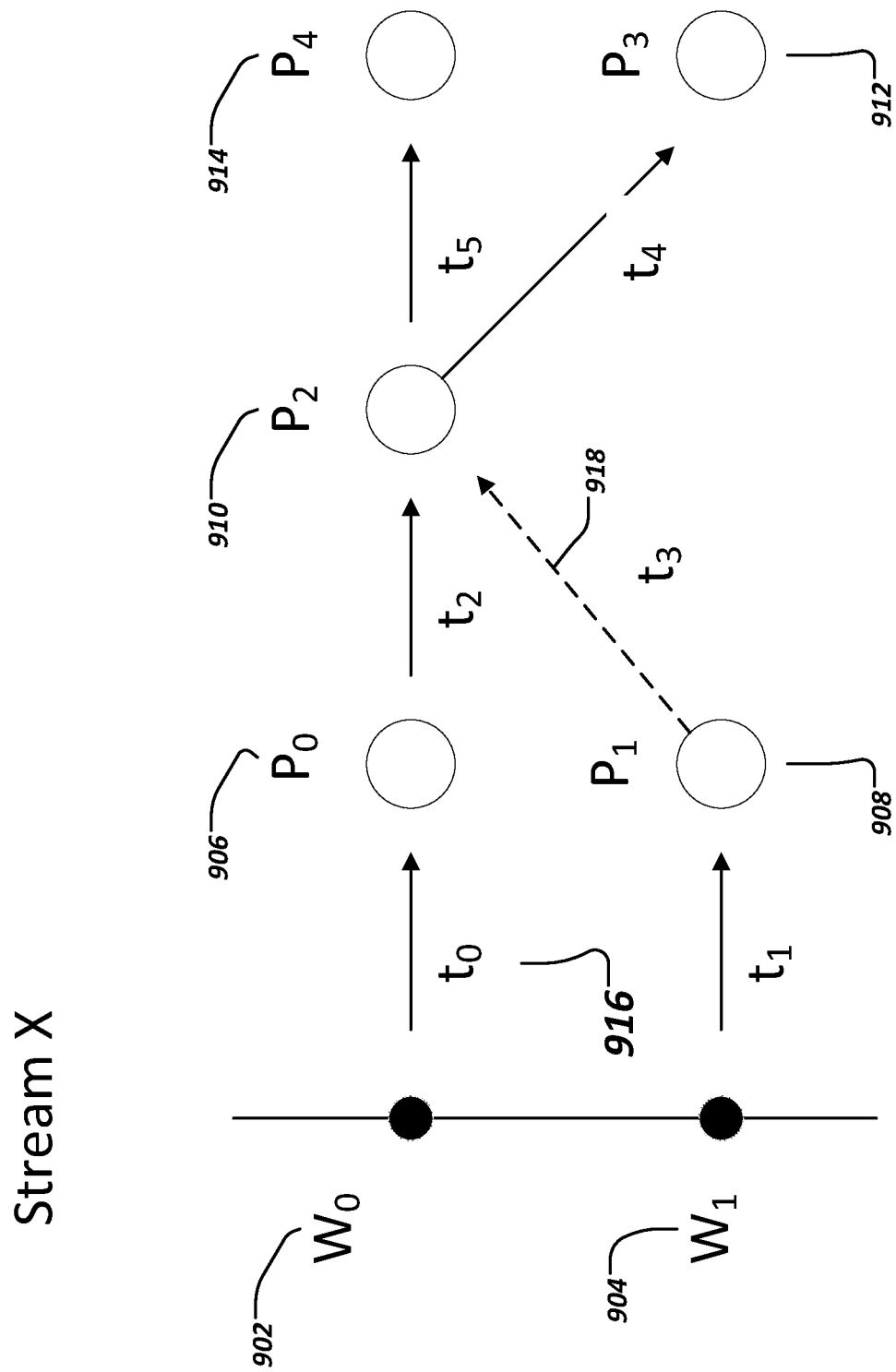
FIG. 9 is a directed graph that illustrates a data stream.

FIG. 9 is a directed graph 900 that illustrates a data stream (e.g., a data stream "X"). A writer "w0" 902 and a writer "w1" 904 have written data to the data stream. Five partitions "p0" 906, "p1" 908, "p2" 910, "p3" 912, and "p4" 914 have been created to hold data written to the data stream, with the five partitions residing on the same or different nodes within a distributed system. The writing of data to the data stream by a given writer can be represented by a single path of edges in the directed graph 900. Each edge is associated with a particular writer and is annotated with a time point indicator (e.g., "t0" 916) that indicates a point in time at which the particular writer began writing to a partition (e.g., the writer w0 902 started writing to the p0 partition 906 at the time t0 916).

The edges for a given writer connect all the partitions the writer wrote to in the data stream. The w0 writer 902 has written to the p0 partition 906, the p2 partition 910, and the p4 partition 914. The w1 writer 904 has written to the p1 partition 908, the p2 partition 910, and the p3 partition 912.

A dashed edge 918 between the p1 partition 908 and the p2 partition 910 indicates that the managing broker for the data stream decided to join the paths of the w0 writer 902 and the w1 writer 904 in the p2 partition 910 (e.g., let both writers write to the p2 partition 910). At a later point in time, the writers 902 and 904 were instructed to again write to separate partitions (e.g., the partition p4 914 and the partition p3 912, respectively).

A writer can be directed to write to a different partition when a current partition is full, for example. Partitions can have a predefined or configurable maximum size, for example. A cap on partition size can be used, for example, to improve performance of applications, as compared to partitions of arbitrarily large size. A local broker can direct a writer to write to a different partition for other reasons. For example, the local broker may determine that a current load of write-partition requests is greater than a threshold load, and can determine to deny a certain number of subsequent write-partition requests to reduce an upcoming load to be less than the threshold load.

A local broker may provide, to a writer in response to a write-partition request, information indicating that the writer should request a new partition. The writer w0 902 may receive a response from the local broker of the p0 partition indicating that the p0 partition 906 is full, for example. The writer w0 902 can send a write-intent request to a manager broker of the data stream for a new target partition (e.g., a partition to write to). The managing broker can provide host information for the p2 partition 910 to the writer w0 902 that enables the writer w0 902 to send a write-partition request to the p2 partition 910.

Similarly, the writer w1 904 can receive a response from a local broker for the p1 partition 908 indicating that writing to the p1 partition 908 is no longer allowed. The w1 writer 904 can send a write-intent request to the managing broker of the data stream for a new target partition, and receive host information for the p2 partition 910. The managing broker can decide that both the w0 902 and w1 904 writers can write to the same p2 partition 910, for example.

When the p2 partition becomes full, the w0 902 and w1 904 writers may each get a message indicating that the p2 partition is no longer available for writing. The w0 writer 902 can send a write-intent request to the managing broker for a new target partition, and receive host information for the p4 partition 914. Similarly, the w1 writer 904 can send a write-intent request to the managing broker for a new target partition, and receive host information for the p3 partition 912.

The managing broker of the data stream can instruct readers in which order to read the partitions of the data stream, so as to satisfy an order preservation policy that all messages of each individual writer can be read by a reader in the order they were written. The managing broker of the data stream illustrated by the directed graph 900 might instruct a reader to read from the data stream in the following sequence of partitions: p0, p1, p2, p3, p4. Another valid read sequence can be: p1, p0, p2, p4, p3. Since both writers w0 902 and w1 904 have written to the p2 partition 910, the p2 partition 910 can be a synchronization point. Both of the partitions p0 906 and p1 908 are to be read before the p2 partition 910.

Figure 10:
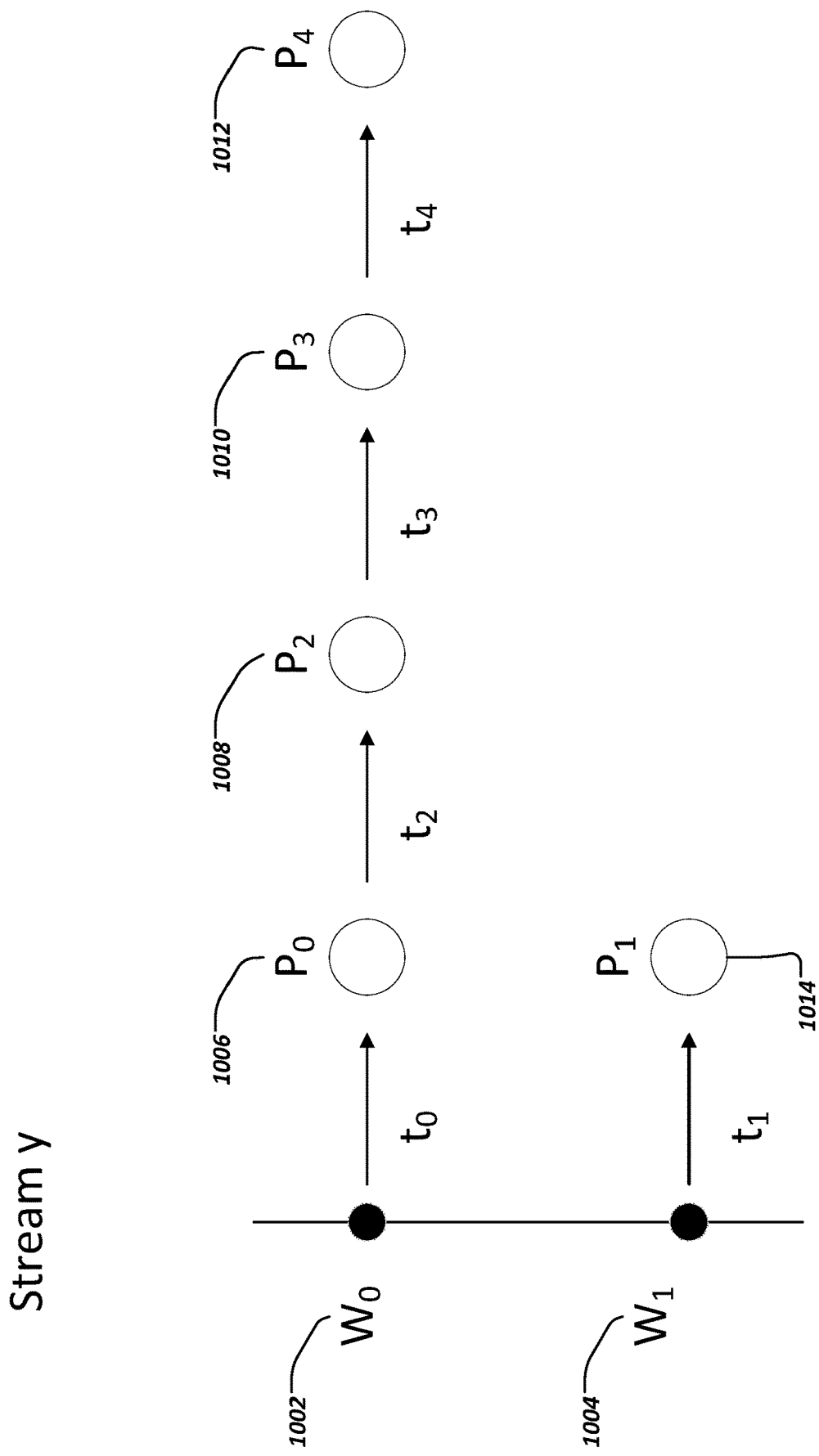
FIG. 10 is a directed graph that illustrates a data stream which may be associated with reader starvation.

FIG. 10 is a directed graph 1000 that illustrates a data stream which may be associated with reader starvation. Reader starvation is a situation in which a single slow writer (e.g., writing at a rate lower than threshold) can slow down some or all readers of a data stream, even if data written by other, faster writers is available and would allow a higher overall read rate. A writer can be a slow writer, for example, such as if there is a low frequency of real-world events (e.g., a temperature of a component doesn't change much or at all during a given time period). As another example, a component may be malfunctioning, and therefore not writing data in a given time period. Which writers may be slow writers can be hard to predict, since a fluctuation in write rates might be caused by a wide variety of reasons.

In the directed graph 1000, a w0 writer 1002 and a w1 writer 1004 are writing to the data stream. The w0 writer 1002 is a faster writer than the w1 writer. The w0 writer 1002 has written to p0 1006, p2 1008, p3 1010, and p4 1012 partitions. The w1 writer 1004 has written only to a p1 partition 1014. A managing broker for the data stream may instruct a reader to read from the p1 partition 1014 before other partitions. The reader can read from the p1 partition 1014 (perhaps while data is still being written to the p1 partition 1014) until the p1 partition 1014 is filled and closed, before reading data from the other partitions. The read rate of the reader can be therefore limited by the write rate of the slower writer w1 1004. As described below, a managing broker of a data stream can create and manage levels of partitions to avoid reader starvation. Partitions can be grouped into levels, and when one level of a partition is closed (e.g., due to being full), then all other partitions at the same level can also be closed, which can be a way of closing "stale" partitions that may not have been written to much recently or that may otherwise be associated with a slow writer.

Figure 11:
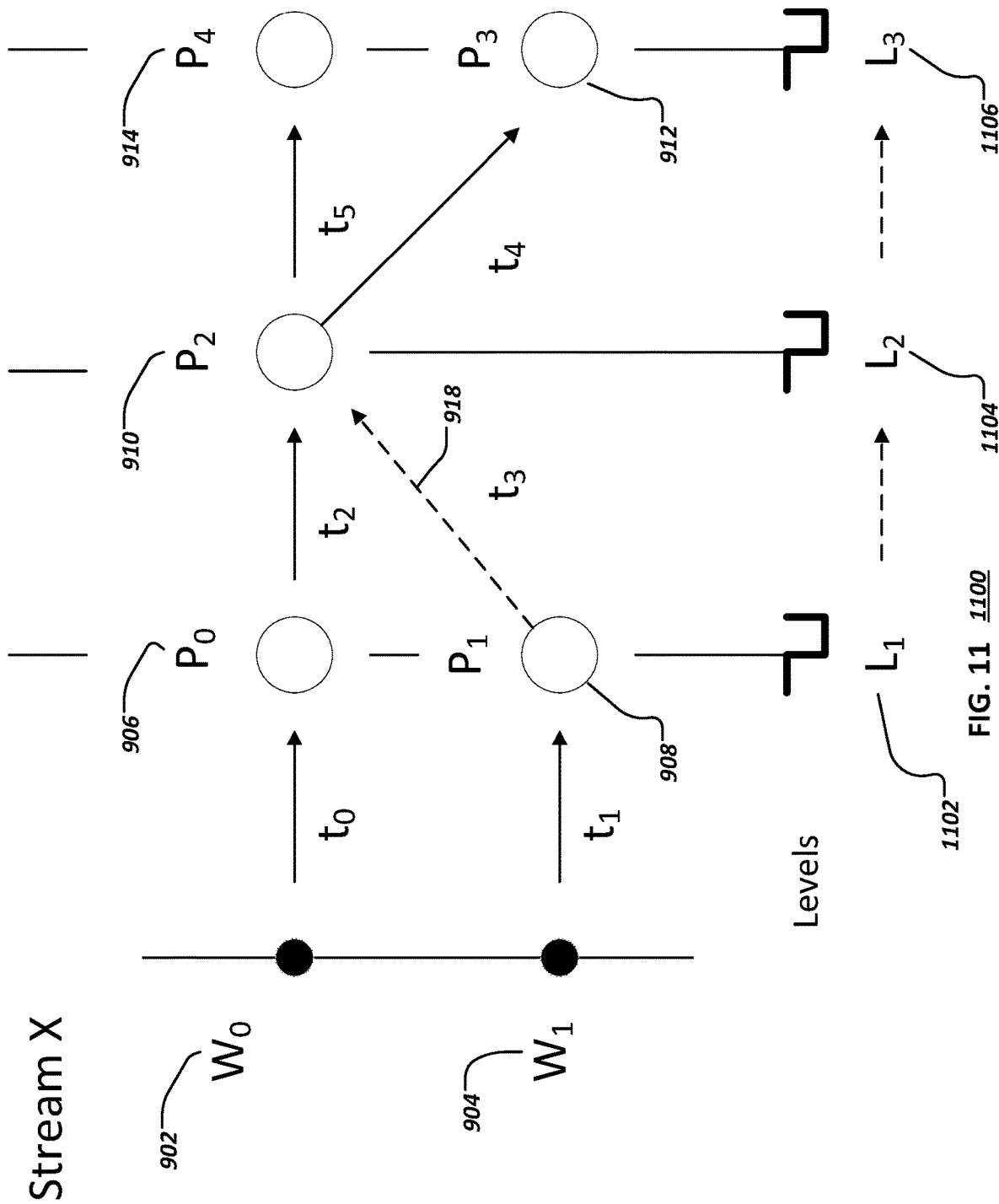
FIG. 11 is a directed graph that illustrates the use of levels of partitions.

FIG. 11 is a directed graph 1100 that illustrates the use of levels of partitions. Levels can be used to close partitions of slow writers for further write operations (even if they are not filled) in order to avoid reader starvation. The directed graph 1100 is divided into disjoint subsets of vertices called levels. The directed graph 1100 illustrates level organization for the data stream "x" previously discussed with respect to FIG. 9. When using level organization, there may be at most one single partition per specific writer per level. For example, a first level "L1" 1102 includes the partitions p0 906 and p1 908. With level organization, the outgoing edges of all partitions which are included in a level only point to partitions which are included in higher levels (e.g., with a larger distance to a root level).

New levels can be added when the directed graph 1100 grows (e.g., when new partitions are added). For example, the p0 partition 906, when created, can be assigned to the first level L1 1102. The p1 partition 908, when created, can also be assigned to the first level L1 1102, because the first level L1 1102 does not currently include a partition used by the w1 writer 904. In general, newly created partitions can be added to a current level (e.g., the latest level created), if there is not a current partition for the writer in the current level. In some implementations, a managing broker uses a counter to identify and to adjust a current level.

When a new partition is created for a writer, after a previous partition has been filled, a new level can be created. For example, when the w0 writer 902 begins writing to the p2 partition 910, the p2 partition 910 can be assigned to a second level "L2" 1104. The p2 partition 910 can be added to the second level L2 1104 rather than the first level L1 1102 because the first level L1 1102 already includes a partition (e.g., the partition p0 906) used by the writer w0 902.

When the second level L2 1104 is created, partitions in the previous level (e.g., the first level L1 1102) can be closed.

For example, the managing broker can send a close partition message to the local broker(s) that host the p0 partition 906 and the p1 partition 908. If the w0 writer 902 or the w1 writer 904 are slow writers, the closing of the first level L1 1102 can enable readers to read the partition p0 906 and/or p1 908 and to possibly move on to reading other partitions, without waiting for the p0 906 or p1908 partition to be filled.

A third level "L3" 1106 includes the p3 partition 912 and the p4 partition 914. The third level L3 1106 can be created when the p3 partition 912 is created for the w1 writer 904, for example. When the w0 writer needs a new partition at time point t5, the p4 partition 914 can be created and added to the third level L3 1106.

Figure 12:
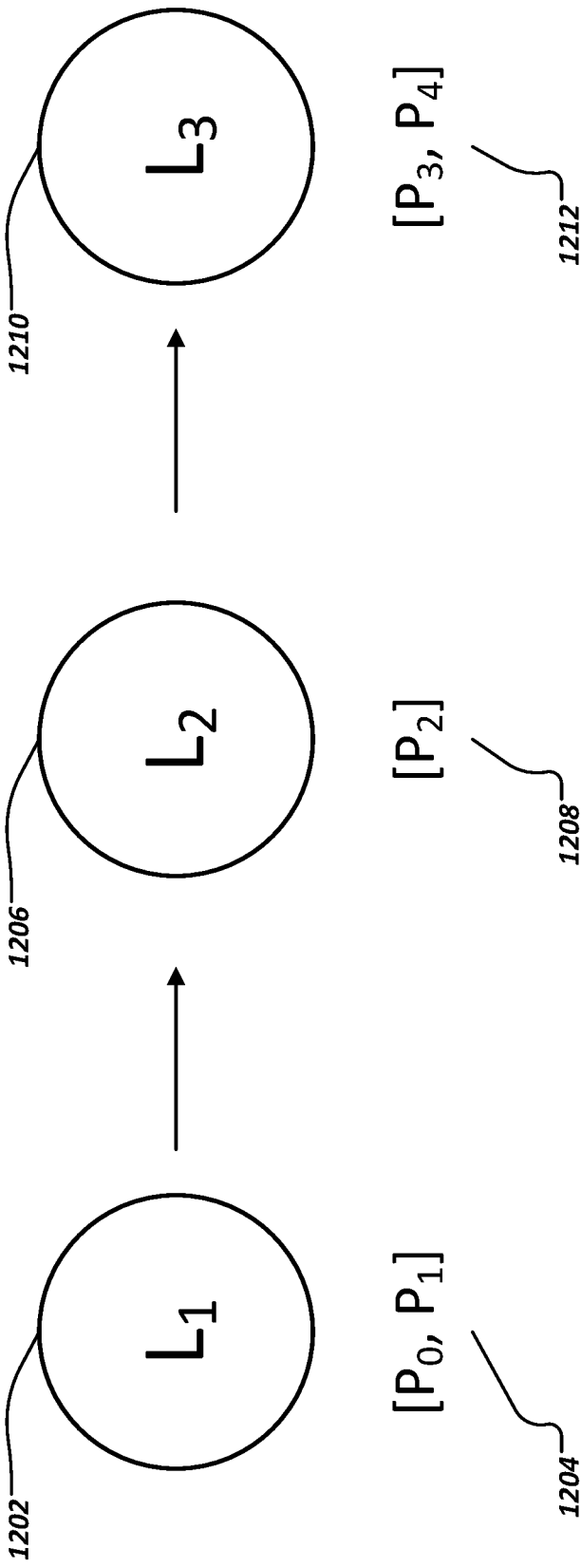
FIG. 12 is a directed graph that represents levels in a data stream.

FIG. 12 is a directed graph 1200 that represents levels in a data stream. The directed graph 1200 is a representation of levels that are included in the directed graph 1100 described above with respect to FIG. 11. A vertex 1202 represents the first level L1 1102 that includes p0 and p1 partitions 1204. A vertex 1206 represents the second level L2 1104 that includes the p2 partition 1208. A vertex 1210 represents the third level L3 1106 that includes the partitions p3 and p4 1212.

Figure 13:
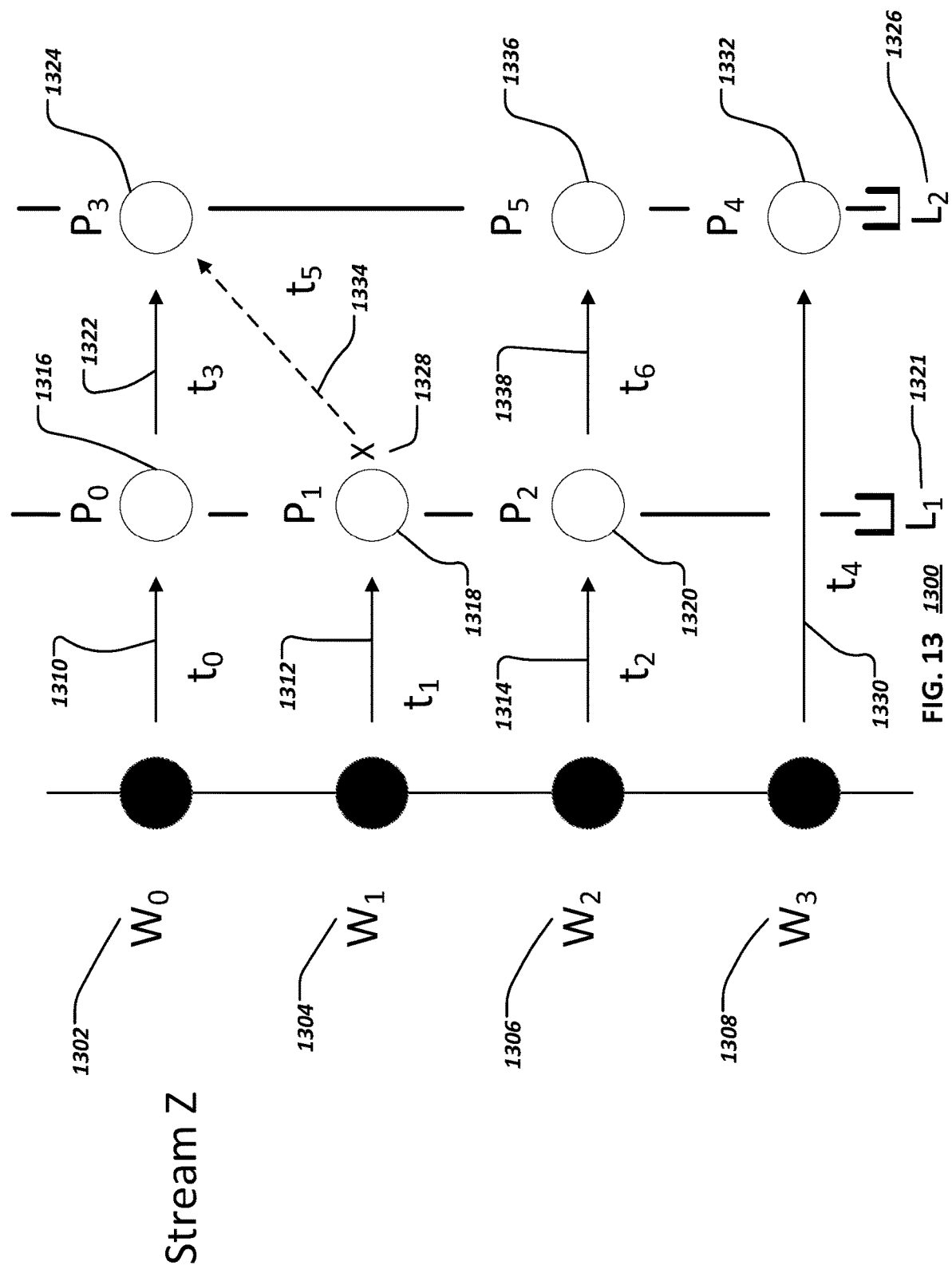
FIG. 13 is a directed graph that illustrates the use of levels for preventing reader starvation.

FIG. 13 is a directed graph 1300 that illustrates the use of levels for preventing reader starvation. The directed graph 1300 illustrates four writers w0 1302, w1 1304, w2 1306, and w3 1308 that write to a data stream "z". At time points t0 1310, t1 1312, and t2 1314, the writers w0 1302, w1 1304, and w2 1306 began writing to partitions p0 1316, p1 1318, and p2 1320, respectively. The p0 1316, p1 1318, and p2 1320 partitions are created in a first level L1 1321.

At a time point t3 1322, the p0 partition 1316 is closed due to being full and a new partition p3 1324 is created, in a new, second level L2 1326. When the second level L2 1326 is created, a close operation is triggered for the first level L1 1321. The close operation can include close-level requests being sent to local brokers on the nodes that include the partitions p1 1318 and p2 1320, respectively indicating that the p1 1318 and p2 1320 partitions are to be closed.

A close-level request can include deadline information which can indicate a time by which all partitions in the level are to be closed. As another example, deadline information may be accessible by a node through a system or stream-level configuration setting. For example, deadline information may indicate that partitions are to be closed no later than one minute after receiving a close-level request.

A local broker can determine whether to close a partition immediately after receiving the close-level request, or to keep the partition open longer, possibly until the deadline. Various factors can be used by the local broker to determine whether to immediately close a partition, including information about past or anticipated use of the partition. For example, the local broker can decide when to close the partition based on statistical data about a current write rate, a current read rate, a number of readers reading from the partition within a recent time window, a number of writers writing to the partition within a recent time window, etc.

It can be desirable to keep some partitions open longer to use space that was configured for the partitions and to allow some writers, particularly those who are writing at a frequency higher than a threshold, to continue to write more data to partitions up until the deadline. However, it can be undesirable to have all partitions stay open until the deadline. If all partitions close at or near the deadline, then subsequent write-partition requests for those partitions may be denied, and in response to the denials, multiple write-intent requests for new partitions may be sent to the managing broker for the data stream in a same time window, which may result in an undesirable load on the managing broker.

In some implementations, randomness can be used to have different partitions close at different times. For example, the managing broker can be configured to send close-level requests to different nodes at different, random times. The different, random times can be within a certain time window after a determination has been made to close a level, and each random time can be before a deadline. As another example, a local broker can include a randomness factor when determining when and whether to close a partition before a deadline. As yet another example, different, random deadlines can be determined (by the managing broker or by the local broker) for different nodes or partitions. The different, random deadlines can be set so that all of the different, random deadlines are within a certain time window.

The degree to which the different deadlines can vary from node to node can be a configuration setting, which can be applied on a system or data stream level. Other configuration settings can be system-level or data stream-level, such as a global or data stream-level setting when a constant deadline time window is used (e.g., a system or data stream can be configured so that all partitions of a level are to be closed within one minute after the level is closed). Configuration settings can specify thresholds for what constitutes a fast or slow writer, for example. System or data stream level settings can be configured programmatically and/or manually by an administrator. Accordingly, the system in general and particular data streams can be automatically or manually optimized so that a desired behavior is achieved.

For the data stream represented by the directed graph 1300, the local broker for the p1 partition 1318 can determine that a write rate to the p1 partition is low (e.g., below a threshold) and that the p1 partition 1318 is to be closed immediately in response to the received close-level request. An "x" 1328 illustrates the closing of the p1 partition 1318. As another example, the local broker for the p2 partition 1320 can determine to keep the p2 partition 1320 open temporarily after receipt of the close-level request, based on a determined write rate and fill percentage for the p2 partition 1320, such as to try to fill more of the p2 partition 1320 before the close deadline.

Various types of operations can occur after a close request. For example, at a time point t4 1330 that is after the close-level request but before the deadline, the w3 writer 1308 can request to write to the data stream. A new partition p4 1332 can be created in the second level L2 1326 and assigned to the w3 writer 1308. A new write-partition request from the w1 writer 1304 to write to the closed p1 partition 1318 can be denied, and the w1 writer 1304 can request a new partition to write to after receiving the denial. The managing broker can decide to instruct the w1 writer 1304 to write to the existing p3 partition 1324, beginning at a time point t5 1334. The w2 writer 1306 can fill the p2 partition 1320 before the close deadline and can request a new partition to write to after the p2 partition 1320 is full. A p5 partition 1336 can be created in the second level L2 1326, and the w2 writer 1306 can begin writing to the p5 partition 1336 at a time point t6 1338.

Figure 14:
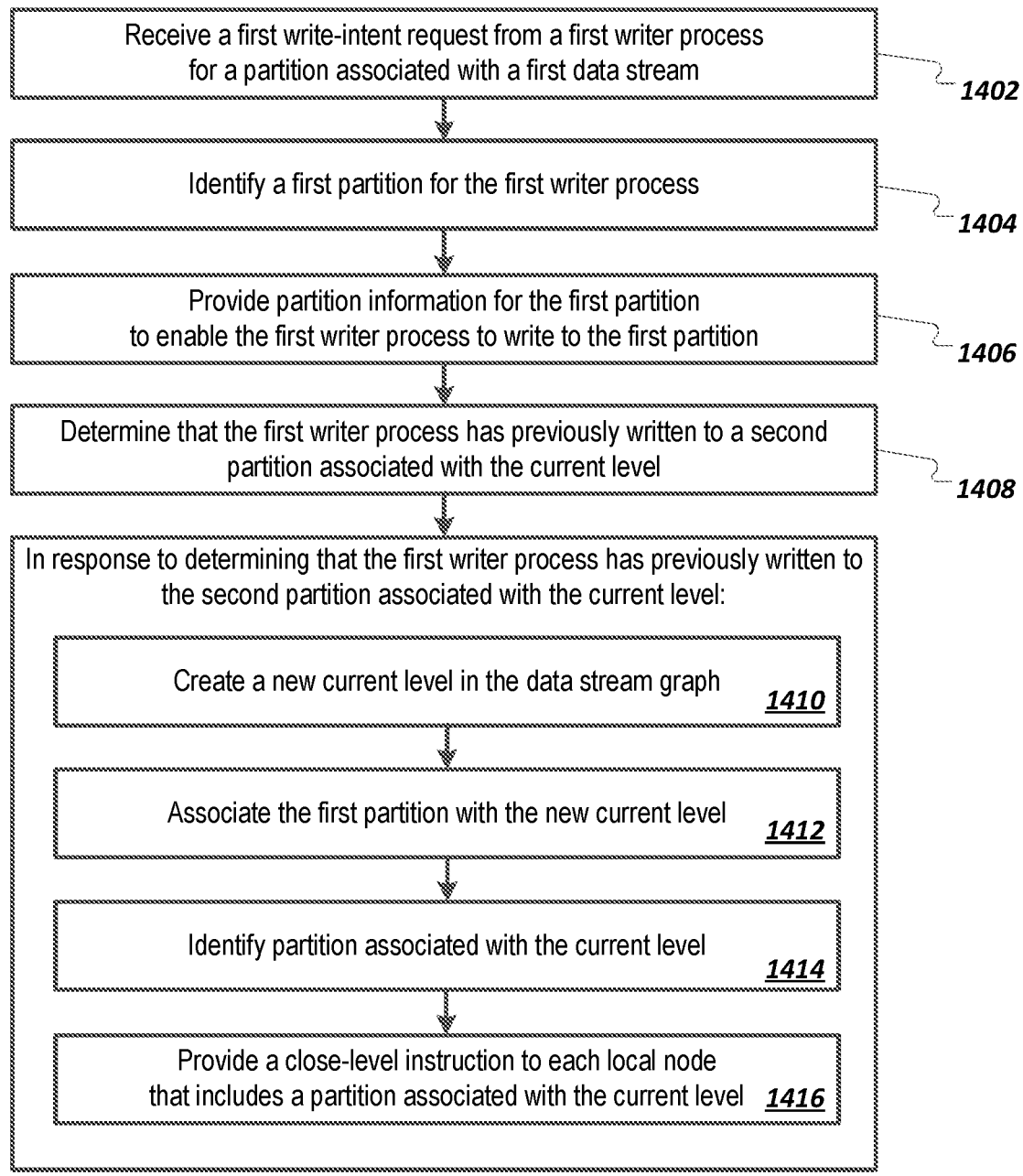
FIGS. 14 and 15 are flowcharts of example methods for preventing reader starvation in a distributed system.

FIG. 14 is a flowchart of an example method 1400 for preventing reader starvation in a distributed system. It will be understood that method 1400 and related methods may be performed, for example, by any suitable system, environment, software, and hardware, or a combination of systems, environments, software, and hardware, as appropriate. For example, one or more of a client, a server, or other computing device can be used to execute method 1400 and related methods and obtain any data from the memory of a client, the server, or the other computing device. In some implementations, the method 1400 and related methods are executed by one or more components of the system 800 described above with respect to FIG. 8. For example, the method 1400 and related methods can be executed by the managing broker 811 of FIG. 8.

At 1402, a first write-intent request is received, at a managing node that manages a first data stream in a distributed system, from a first writer process for a partition associated with a first data stream.

At 1404, a first partition is identified for the first writer process. The first partition is located at a first local node in the distributed system. The first local node can be the same or a different node as the managing node.

At 1406, partition information is provided, responsive to the first write-intent request, for the first partition, to enable the first writer process to write to the first partition. The partition information can be location information (e.g., host information) for the first local node.

At 1408, a determination is made that the first writer process has previously written to a second partition associated with the current level. The second partition can be associated with a second local node.

At 1410, in response to determining that the first writer process has previously written to a second partition associated with the current level, a new current level is created in the data stream graph.

At 1412, the first partition is associated with the current level.

At 1414, partitions associated with the first level are identified, including the identification of the second partition and a third partition associated with a second writer process located at a third local node.

At 1416, a close-level instruction is provided to each local node that includes a partition associated with the current level, including the providing of the close-level instruction to the second local node and the third local node. The close-level instruction can include a closing deadline that is a time by which partitions associated with the level are to be closed. The closing deadline can be a data stream or system level setting, for example. As another example, and as described in more detail below, a respective local node can determine the closing deadline. The closing of partitions can enable the managing node to select from a larger number of read sequences to be provided to reader processes, which can avoid or reduce reader starvation, as described above.

Figure 15:
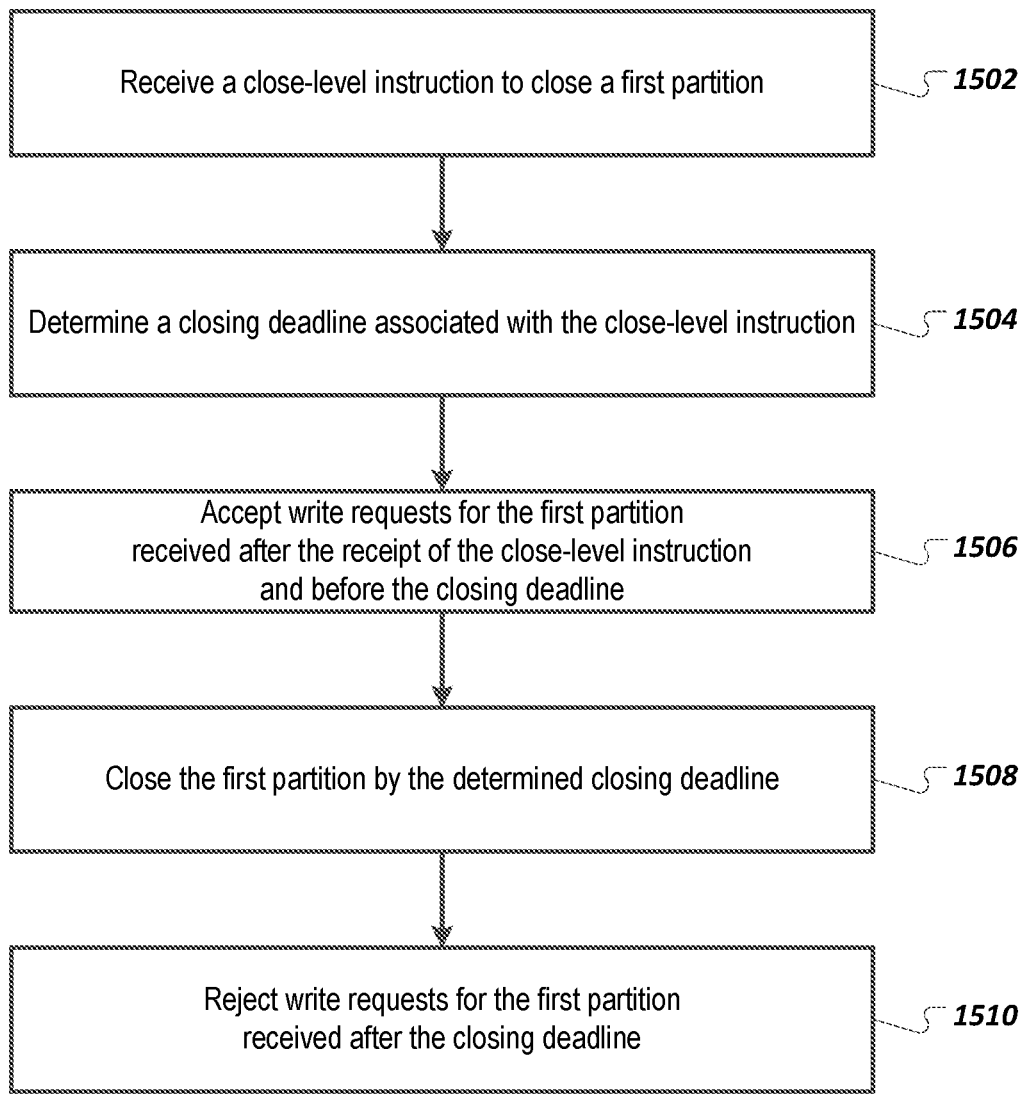

FIG. 15 is a flowchart of an example method 1500 for preventing reader starvation in a distributed system. It will be understood that method 1500 and related methods may be performed, for example, by any suitable system, environment, software, and hardware, or a combination of systems, environments, software, and hardware, as appropriate. For example, one or more of a client, a server, or other computing device can be used to execute method 1500 and related methods and obtain any data from the memory of a client, the server, or the other computing device. In some implementations, the method 1500 and related methods are executed by one or more components of the system 800 described above with respect to FIG. 8. For example, the method 1500 and related methods can be executed by the local broker 816 of FIG. 8.

At 1502, a close-level instruction is received, at a first local node, from a master broker, to close a first partition.

At 1504, a closing deadline associated with the close-level instruction is determined. For example, a closing deadline included in the close-level instruction may be identified. As another example, the first local node can determine the closing deadline. For example, the first local node can identify at least one closing deadline rule, identify node-level status information associated with the first partition, and calculate the closing deadline based on the closing deadline rule(s) and the node-level status information. For example, the node-level status information can include one or more of a current writing status for the first partition, statistical write data for the first partition, or a number of active readers of the first partition. The closing deadline rule can refer to one or more of a current writing status for the first partition, statistical write data for the first partition, or a number of active readers of the first partition. For example, a closing deadline rule can specify that a given partition is to be closed immediately if a recent write rate for the partition is less than a threshold. As another example, a closing deadline rule can specify that a given partition is to remain open until the deadline if the recent write rate is more than the threshold, or if a number of active writers or active readers are more than other respective thresholds.

At 1506, the closing deadline is applied, including the accepting of write-partition requests for the first partition that are received after the receipt of the close-level instruction and before the closing deadline.

At 1508, the first partition is closed by the determined closing deadline.

At 1510, write-partition requests from writer processes that are received after the closing deadline are rejected. Each rejection can include an indication for the respective writer process to request a new partition. A new partition may be associated with a new level.

The preceding figures and accompanying description illustrate example processes and computer-implementable techniques. But system 800 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 800 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method comprising:
receiving, at a managing node that manages a first data stream in a distributed system, a first write-intent request from a first writer process of one or more writer processes for a first partition of one or more partitions associated with the first data stream, the first data stream associated with a data stream graph that includes at least one level of partitions including a current level and is a finite directed graph without directed cycles;

identifying the first partition for the first writer process, the first partition located at a first local node in the distributed system;

providing, responsive to the first write-intent request, partition information for the first partition to enable the first writer process to write to the first partition;

determining that the first writer process has previously written to a second partition of the one or more partitions associated with the current level, the second partition associated with a second local node; and in response to determining that the first writer process has previously written to the second partition associated with the current level:

creating a new current level of the at least one level of partitions in the data stream graph, wherein creating the new current level in the data stream graph causes a close operation being triggered for the current level;

associating the first partition with the new current level;

identifying partitions associated with the current level, including the second partition and a third partition associated with a second writer process of the one or more writer processes located at a third local node; and in response to the close operation being triggered for the current level, providing a close-level instruction to each local node that includes a partition associated with the current level, including the second local node and the third local node, wherein there is at most one single partition of the at least one level of partitions per specific writer process of the one or more writer processes per level of the at least one level of partitions.

2. The method of claim 1, further comprising:

receiving a second write-intent request from a third writer process for a fourth partition associated with the first data stream;

identifying the fourth partition for the third writer process, the fourth partition located at a fourth local node in the distributed system;

providing, responsive to the second write-intent request, partition information for the fourth partition to enable the third writer process to write to the fourth partition;

determining that the third writer process has not previously written to any partitions associated with the new current level; and associating the fourth partition with the new current level.

3. The method of claim 1, further comprising:

receiving, at the second local node, the close-level instruction to close the second partition;

determining a closing deadline associated with the close-level instruction as a determined closing deadline; and applying the determined closing deadline.

4. The method of claim 3, wherein applying the determined closing deadline comprises:

accepting write-partition requests for the second partition received after receiving the close-level instruction and before the determined closing deadline;

closing the second partition by the determined closing deadline; and rejecting write-partition requests for the second partition received after the closing deadline.

5. The method of claim 3, wherein determining the closing deadline comprises identifying the closing deadline in the close-level instruction.

6. The method of claim 3, wherein determining the closing deadline comprises:

identifying at least one closing deadline rule;

identifying status information associated with the second partition; and calculating the closing deadline based on the at least one closing deadline rule and the status information associated with the second partition.

7. The method of claim 6, wherein the status information associated with the second partition comprises at least one of a current writing status for the second partition, statistical write data for the second partition, or a number of active readers of the second partition.

8. The method of claim 3, wherein determining the closing deadline comprises determining to immediately close the second partition.

9. The method of claim 3, wherein the closing deadline is a data stream level setting associated with the first data stream.

10. The method of claim 3, wherein the closing deadline is a system level setting associated with the distributed system.

11. The method of claim 1, wherein the first writer process sends the first write-intent request after being notified that the second partition is full.

12. A system comprising:

one or more computers; and a computer-readable medium coupled to the one or more computers having instructions stored thereon which, when executed by the one or more computers, cause the one or more computers to perform operations comprising:

receiving, at a managing node that manages a first data stream in a distributed system, a first write-intent request from a first writer process of one or more writer processes for a first partition of one or more partitions associated with the first data stream, the first data stream associated with a data stream graph that includes at least one level of partitions including a current level and is a finite directed graph without directed cycles;

identifying the first partition for the first writer process, the first partition located at a first local node in the distributed system;

providing, responsive to the first write-intent request, partition information for the first partition to enable the first writer process to write to the first partition;

determining that the first writer process has previously written to a second partition of the one or more partitions associated with the current level, the second partition associated with a second local node; and in response to determining that the first writer process has previously written to the second partition associated with the current level:

creating a new current level of the at least one level of partitions in the data stream graph, wherein creating the new current level in the data stream graph causes a close operation being triggered for the current level;

associating the first partition with the new current level;

identifying partitions associated with the current level, including the second partition and a third partition associated with a second writer process of the one or more writer processes located at a third local node; and in response to the close operation being triggered for the current level, providing a close-level instruction to each local node that includes a partition associated with the current level, including the second local node and the third local node, wherein there is at most one single partition of the at least one level of partitions per specific writer process of the one or more writer processes per level of the at least one level of partitions.

13. The system of claim 12, the operations further comprising:

receiving a second write-intent request from a third writer process for a fourth partition associated with the first data stream;

identifying the fourth partition for the third writer process, the fourth partition located at a fourth local node in the distributed system;

providing, responsive to the second write-intent request, partition information for the fourth partition to enable the third writer process to write to the fourth partition;

determining that the third writer process has not previously written to any partitions associated with the new current level; and associating the fourth partition with the new current level.

14. The system of claim 12, the operations further comprising:

receiving, at the second local node, the close-level instruction to close the second partition;

determining a closing deadline associated with the close-level instruction as a determined closing deadline; and applying the determined closing deadline.

15. The system of claim 14, wherein applying the determined closing deadline comprises:

accepting write-partition requests for the second partition received after receiving the close-level instruction and before the determined closing deadline;

closing the second partition by the determined closing deadline; and rejecting write-partition requests for the second partition received after the closing deadline.

16. The system of claim 14, wherein determining the closing deadline comprises identifying the closing deadline in the close-level instruction.

17. A computer program product encoded on a non-transitory storage medium, the computer program product comprising non-transitory, computer readable instructions for causing one or more processors to perform operations comprising:

receiving, at a managing node that manages a first data stream in a distributed system, a first write-intent request from a first writer process of one or more writer processes for a first partition of one or more partitions associated with the first data stream, the first data stream associated with a data stream graph that includes at least one level of partitions including a current level and is a finite directed graph without directed cycles;

identifying the first partition for the first writer process, the first partition located at a first local node in the distributed system;

providing, responsive to the first write-intent request, partition information for the first partition to enable the first writer process to write to the first partition;

determining that the first writer process has previously written to a second partition of the one or more partitions associated with the current level, the second partition associated with a second local node; and in response to determining that the first writer process has previously written to the second partition associated with the current level:

creating a new current level of the at least one level of partitions in the data stream graph, wherein creating the new current level in the data stream graph causes a close operation being triggered for the current level;

associating the first partition with the new current level;

identifying partitions associated with the current level, including the second partition and a third partition associated with a second writer process of the one or more writer processes located at a third local node; and in response to the close operation being triggered for the current level, providing a close-level instruction to each local node that includes a partition associated with the current level, including the second local node and the third local node, wherein there is at most one single partition of the at least one level of partitions per specific writer process of the one or more writer processes per level of the at least one level of partitions.

18. The computer program product of claim 17, the operations further comprising:

receiving a second write-intent request from a third writer process for a fourth partition associated with the first data stream;

identifying the fourth partition for the third writer process, the fourth partition located at a fourth local node in the distributed system;

providing, responsive to the second write-intent request, partition information for the fourth partition to enable the third writer process to write to the fourth partition;

determining that the third writer process has not previously written to any partitions associated with the new current level; and associating the fourth partition with the new current level.

19. The computer program product of claim 18, the operations further comprising:

receiving, at the second local node, the close-level instruction to close the second partition;

determining a closing deadline associated with the close-level instruction as a determined closing deadline; and applying the determined closing deadline.

20. The computer program product of claim 19 wherein applying the determined closing deadline comprises:

accepting write-partition requests for the second partition received after receiving the close-level instruction and before the determined closing deadline;

closing the second partition by the determined closing deadline; and rejecting write-partition requests for the second partition received after the closing deadline.

* * * * *